(12) United States Patent
Hao

(10) Patent No.: US 9,279,352 B2
(45) Date of Patent: Mar. 8, 2016

(54) INTEGRATED SCR METERING INJECTION SYSTEM

(75) Inventor: Qingjun Hao, Wujiang Jiangsu (CN)

(73) Assignee: SUZHOU POWERGREEN EMISSION SOLUTION SYSTEM CO., LTD, Wujiang Jiangsu (CN)

( * ) Notice: Subject to any disclaimer, the term of this patent is extended or adjusted under 35 U.S.C. 154(b) by 24 days.

(21) Appl. No.: 13/823,443

(22) PCT Filed: May 16, 2011

(86) PCT No.: PCT/CN2011/000855
§ 371 (c)(1),
(2), (4) Date: Aug. 14, 2013

(87) PCT Pub. No.: WO2012/155291
PCT Pub. Date: Nov. 22, 2012

(65) Prior Publication Data
US 2014/0054392 A1 Feb. 27, 2014

(51) Int. Cl.
*F01N 3/00* (2006.01)
*F01N 3/10* (2006.01)
*F01N 3/20* (2006.01)

(52) U.S. Cl.
CPC ............... *F01N 3/10* (2013.01); *F01N 3/2066* (2013.01); *F01N 2610/10* (2013.01); *F01N 2610/14* (2013.01); *F01N 2610/1406* (2013.01); *F01N 2610/1486* (2013.01); *F01P 2060/16* (2013.01); *Y02T 10/24* (2013.01)

(58) Field of Classification Search
CPC ......... F01N 3/10; F01N 3/035; F01N 3/2066; F01N 3/00; F01N 2610/14; F01N 2610/1406; F01N 2610/1486; F01N 2610/10; F01N 3/36; F01N 2610/1426; F01N 2610/02; Y02T 10/24

USPC ................. 60/272–324; 239/302, 135, 74, 71
See application file for complete search history.

(56) References Cited

U.S. PATENT DOCUMENTS

| 7,805,930 | B2 * | 10/2010 | Satou et al. ...................... 60/286 |
| 8,266,892 | B2 * | 9/2012 | Zapf et al. ....................... 60/286 |
| 2009/0127265 | A1 * | 5/2009 | Magnusson et al. .......... 220/564 |

FOREIGN PATENT DOCUMENTS

| CN | 101052790 A | 10/2007 |
| CN | 100529342 C | 8/2009 |

(Continued)

OTHER PUBLICATIONS

Xiao Li, PCT/CN2011/000855 International Search Report, Feb. 1, 2012, State Intellectual Property Office of the P.R. China.

*Primary Examiner* — Jesse Bogue
*Assistant Examiner* — Kelsey Stanek
(74) *Attorney, Agent, or Firm* — Locke Lord LLP; Tim Tingkang Xia, Esq.

(57) ABSTRACT

The invention discloses an integrated SCR metering injection system. The integrated SCR metering injection system includes a metering injection unit and a water heating unit for heating the metering injection unit. The metering injection unit includes a pump body, a membrane pump and a metering valve. The water heating unit includes a water inlet joint, a water inlet pipe, a water outlet pipe and a multi-section water circulation pipe communicated with each other. The water heating unit is used for heating the metering injection unit by heated engine cooling water, so that the heated engine cooling water passes by the metering injection unit directly to improve the recycling rate of energy.

9 Claims, 6 Drawing Sheets

(56) References Cited

FOREIGN PATENT DOCUMENTS

| CN | 101506482 A | 8/2009 |
| CN | 101713315 A | 5/2010 |
| CN | 101828012 A | 9/2010 |
| DE | 102007050272 A1 * | 4/2009 |
| EP | 2006503 A1 | 12/2008 |
| WO | 2010128531 A1 | 11/2010 |
| WO | 2011057077 A1 | 5/2011 |

* cited by examiner

INTEGRATED SCR METERING INJECTION SYSTEM

TECHNICAL FIELD

The invention relates to a reducing agent storage and injection control device in a diesel exhaust treatment purification system, in particular to an integrated SCR metering injection system.

BACKGROUND

With the increasing social requirement on environmental protection, our country has put more and more efforts into environmental protection and appropriate polices regarding vehicle emission have been put forward by relevant national departments, and especially, introduction of 'National Standard IV' results in more stringent control for vehicle emission, which means that the standard can be met only after 30%-50% of pollutant is reduced on the basis of 'National Standard IV', and 'National Standard IV' will come into force nationwide on 2012 in accordance with normal standard implementation procedure.

Now, it is acknowledged that the technology of selective catalytic reduction (SCR) has dominated among vehicle emission post-treatment technologies, that is, a reducing agent is quantitatively injected into an exhaust pipe by atomization and the primary harmful gas NOX in exhaust gas is converted through an SCR catalyst into nitrogen and water which are then discharged out, thus the purpose of exhaust purification is achieved, and this is also the commonest technical route for reaching the 'National Standard IV'.

An SCR system generally includes a liquid storage box, a metering injection unit, a nozzle and the like, however in the prior art, the modular units above are all independent of each other and the reducing agent in the liquid storage box and the metering injection unit is heated in an independent electric heating way or other heating ways, which consequently leads to complex connection between pipe and joint in the system, high possibility of leakage, complex structure under the independent electric heating way or other heating ways and low utilization rate of energy.

SUMMARY OF THE INVENTION

The objective of the invention is to overcome the shortcomings in the prior art and provides an integrated SCR metering injection system with high degree of integration, compact structure, good easiness in ice melting and high utilization rate of energy.

To fulfill the objective above, the technical proposal below is presented in the invention: the integrated SCR metering injection system includes a metering injection unit and a water heating unit for heating the metering injection unit, the metering injection unit includes a pump body, a membrane pump and a metering valve, and the water heating unit includes a multi-section water circulation pipe.

Preferably, the water heating unit further includes a water inlet pipe and a water outlet pipe connected with the water circulation pipe.

The water heating unit further includes a water inlet joint and a water outlet joint, the water inlet joint and the water outlet joint are arranged on the metering injection unit, and the water inlet joint, the water inlet pipe, the water outlet pipe, the water circulation pipe and the water outlet joint are communicated with each other.

The integrated SCR metering injection system further includes a transition plate arranged between the metering injection unit and the water heating unit, and the water inlet pipe and the water outlet pipe are communicated with the water circulation pipe inside the metering injection unit through the transition plate.

The metering injection unit further includes a cover body buckled on the pump body, a closed space is formed between the cover body and the pump body, and the membrane pump is at least arranged inside the closed space.

The water circulation pipe includes a first flow passage and a second flow passage both arranged inside the pump body, and a third flow passage arranged on the lower surface of the pump body and communicated with the first and second flow passages.

A heat insulating sleeve is further arranged on the water inlet pipe.

A heat exchanger is arranged on the junction of the water inlet pipe and the water outlet pipe.

The integrated SCR metering injection system further includes a sensing component, the sensing component includes a liquid level sensor and a first temperature sensor, and the sensing component is integrated with the metering injection unit.

The integrated SCR metering injection system further includes a second temperature sensor for monitoring the temperature of the metering injection unit.

Compared with the prior art, the integrated SCR metering injection system of the invention has the advantages below:

1) superior design scheme and high degree of integration;

2) heated engine cooling water passes by the metering injection unit directly, which avoids using a water heating device or an electric heating device for heating the metering pump independently, and improves the recycling rate of energy;

3) a heat insulating sleeve and a heat exchanger are wrapped on the upper portion of a water inlet pipe to heat the reducing agent at the bottom at first, which brings good heating effect and helps timely ice melting and suction of the reducing agent.

Figure 1:
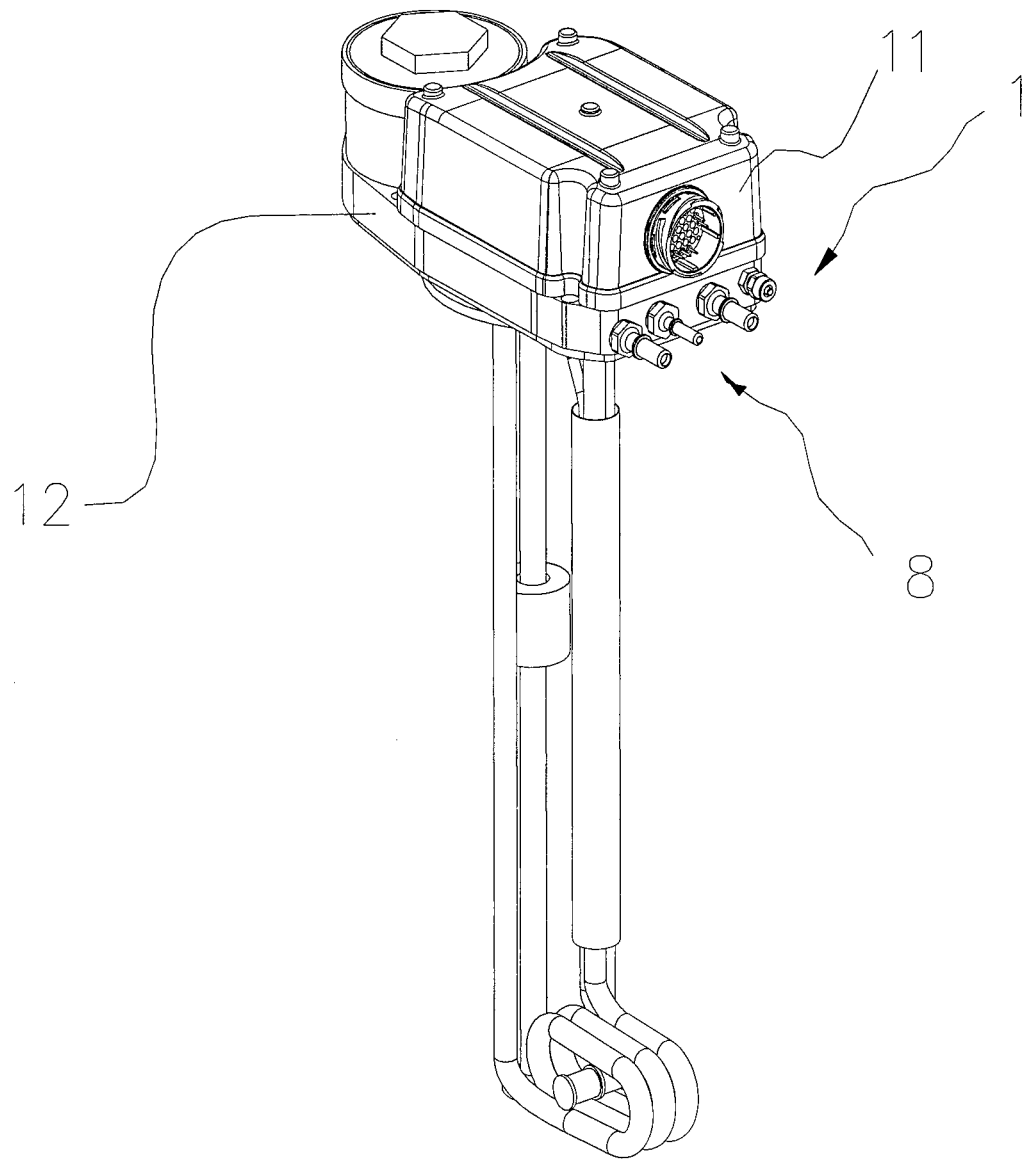
FIG. 1 is a stereogram of the integrated SCR metering injection system of the invention.

| REFERENCE NUMERALS OF ELEMENTS IN THE DRAWINGS | | | | | |
|---|---|---|---|---|---|
| metering injection unit | 1 | liquid storage box | | 2 transition plate | 3 |
| cover body | 11 | pump body | | 12 membrane pump | 13 |
| The first pressure sensor | 14 | The second pressure sensor | | 15 the liquid flow pipe | 16 |
| control unit | | 17 sensing component | | 19 the lower surface | 121 |

-continued

REFERENCE NUMERALS OF ELEMENTS IN THE DRAWINGS

| suction pipe | 31 | rough filtration device | 32 | the filter | 4 |
| metering valve | 5 | the mixing cavity | 6 | | |
| the second electromagnetic valve | 72 | the first electromagnetic valve | 73 | | |
| ventilation pipe | 79 | water heating unit | | 8 water inlet joint | 81 |
| water inlet pipe | 82 | water outlet pipe | | 83 water outlet joint | 84 |
| water circulation pipe | 85 | the first flow passage | 851 | the second flow passage | 852 |
| the third flow passage | 853 | heat exchanger | | 87 heat insulating sleeve | 88 |
| compressed air unit | 9 | air source | | 91 the second electromagnetic valve | 92 |
| reducing valve | 93 | the second temperature sensor | | 94 | |

DETAILED DESCRIPTION OF THE EMBODIMENTS

The technical proposal in the preferred embodiment of the invention will be described below in a clear and complete way with reference to the drawings of the invention.

Figure 2:
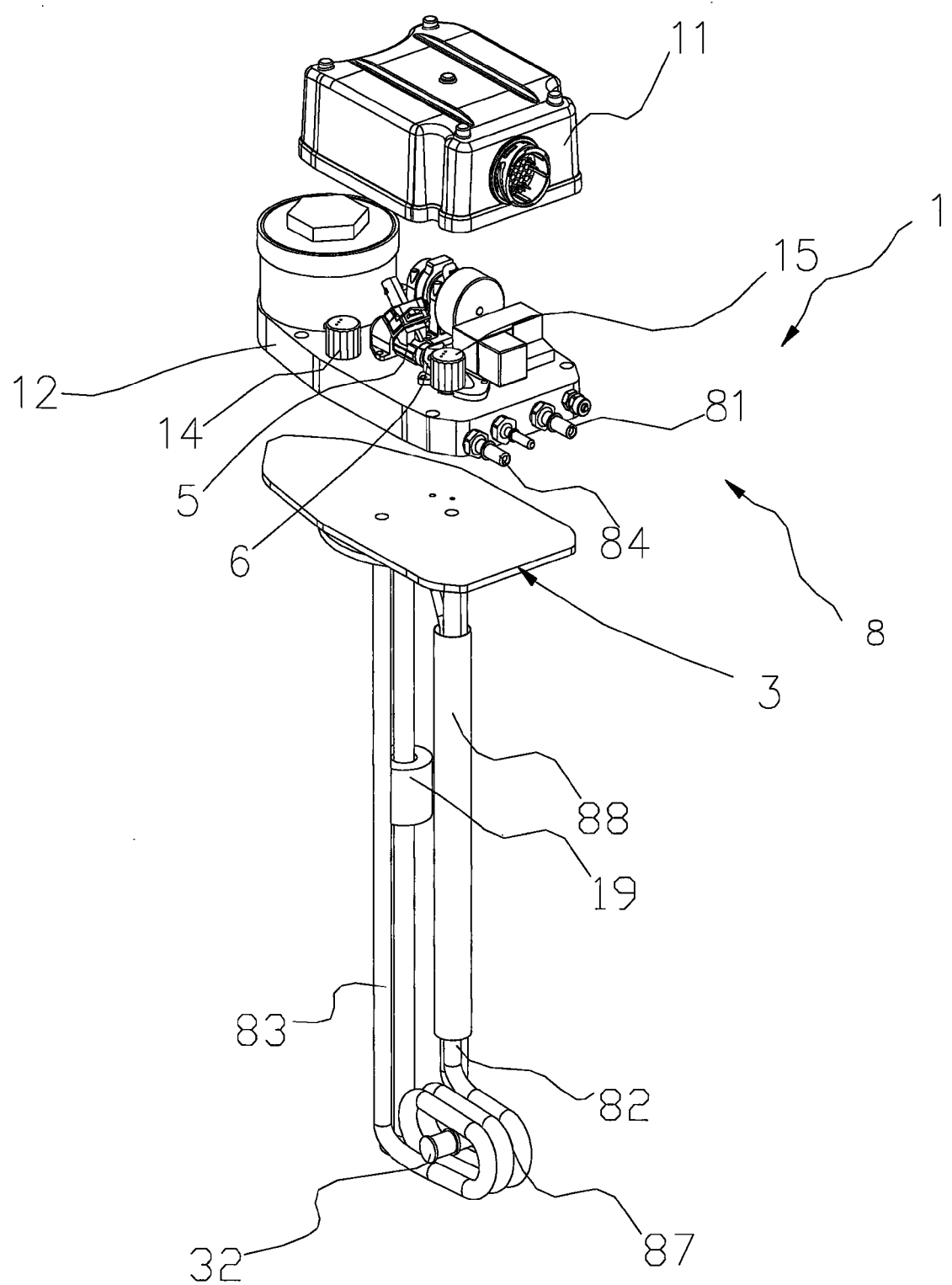
FIG. 2 is an exploded stereogram of FIG. 1.
Figure 3:
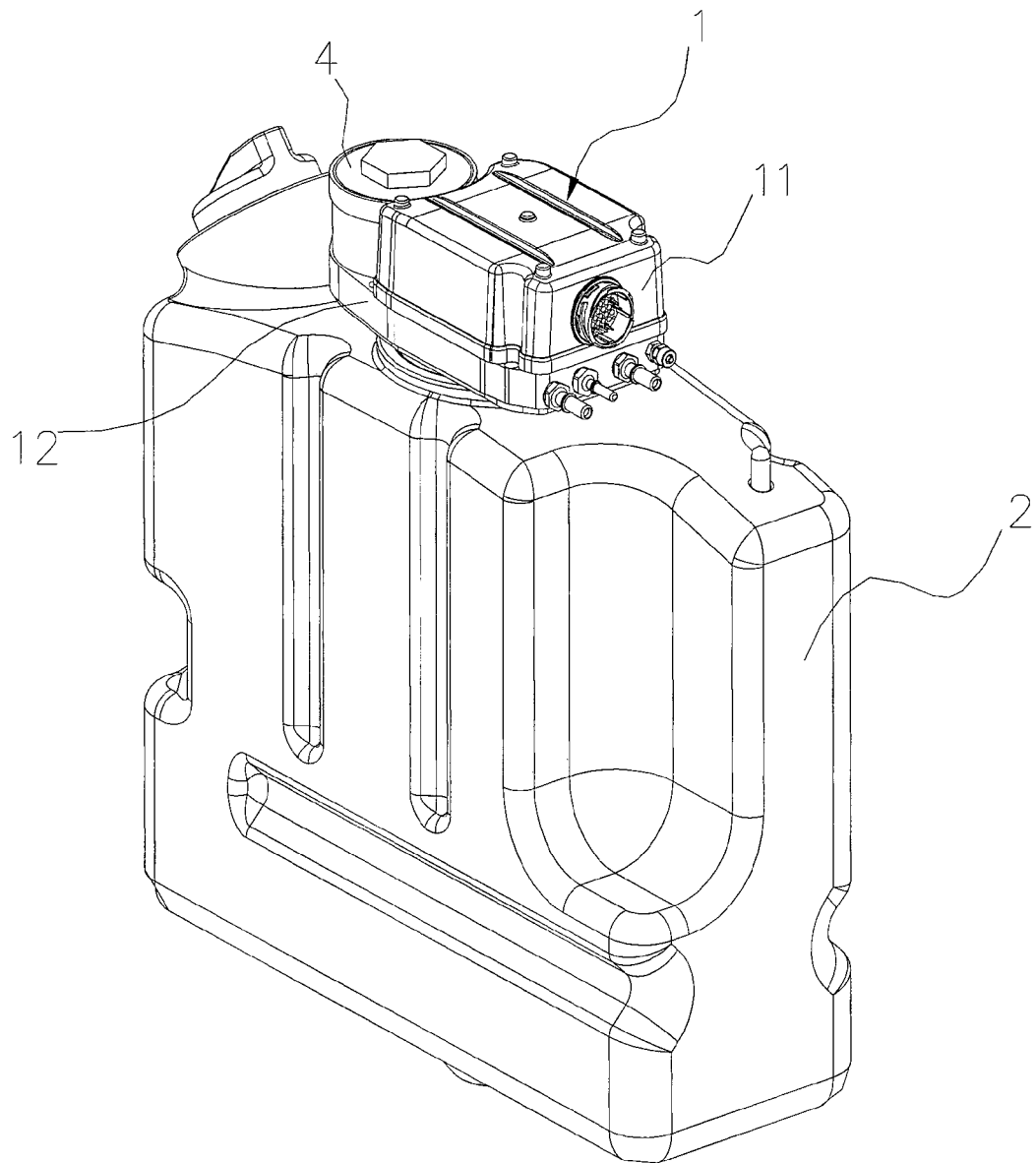
FIG. 3 is a stereogram of the integrated SCR metering injection system of FIG. 2 mounted on the liquid storage box.

As shown in FIGS. 1-3 the integrated SCR metering injection system of the invention includes a metering injection unit 1 and a water heating unit 8, the metering injection unit 1 can be fixedly mounted on a liquid storage box 2 and includes a cover body 11, a pump body 12, a membrane pump 13, a filter 4, a metering valve 5, a mixing cavity 6, a first pressure sensor 14 and a second pressure sensor 15, and a liquid flow pipe 16 arranged on the pump body, a control unit 17, a second temperature sensor 94 for monitoring the temperature of the metering injection unit, and a transition plate 3 arranged below the metering injection unit 1.

The transition plate 3 is mounted below the pump body 12, a water circulation pipe 85 for a part of the liquid flow pipe 16 and the water heating unit 8 are arranged inside a space formed between the transition plate 3 and the lower surface of the pump body, the transition plate 3 is extended downwards to form a suction pipe 31 for sucking a reducing agent from the liquid storage box 2, and the bottom of the suction pipe 31 is connected with a rough filtration device 32 in order to prevent blockage in the injection system caused by entrance of the impurities in the reducing agent.

Figure 4:
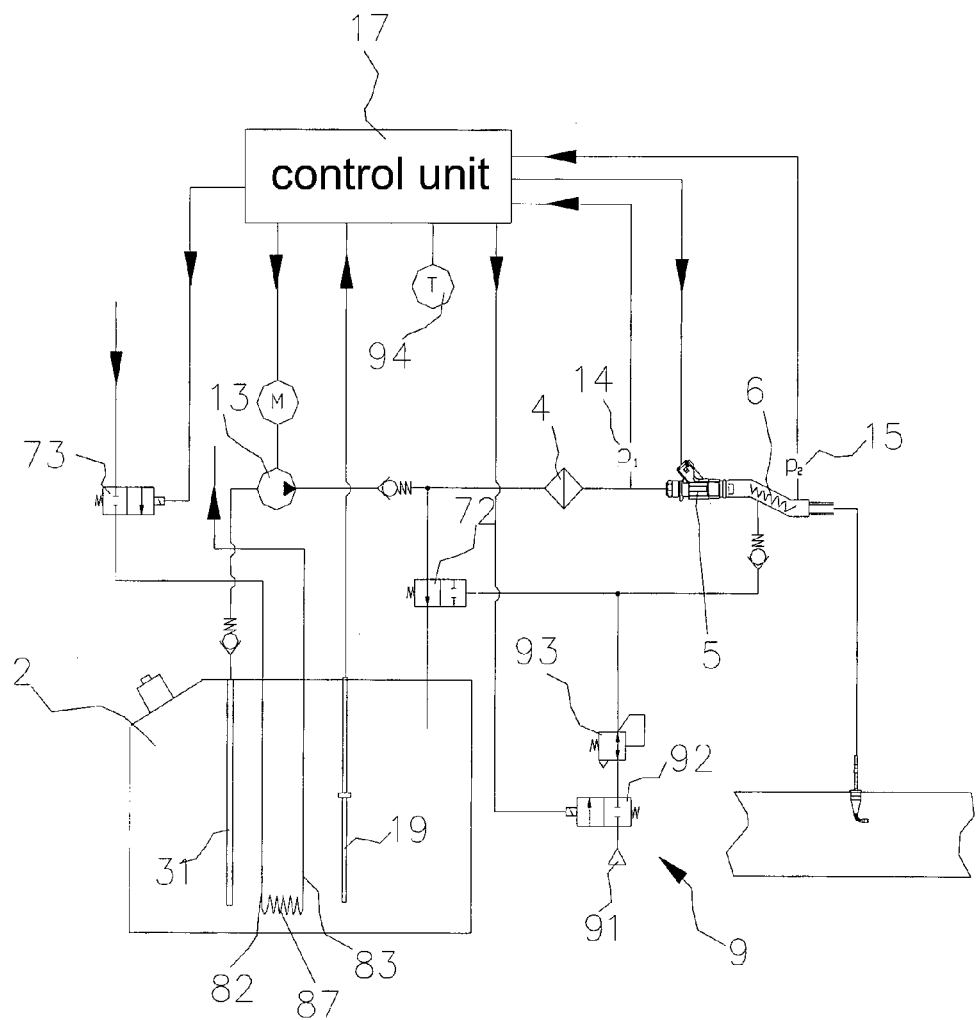
FIG. 4 is a wiring diagram showing the connection between the integrated SCR metering injection system of the invention and the liquid storage box.
Figure 5:
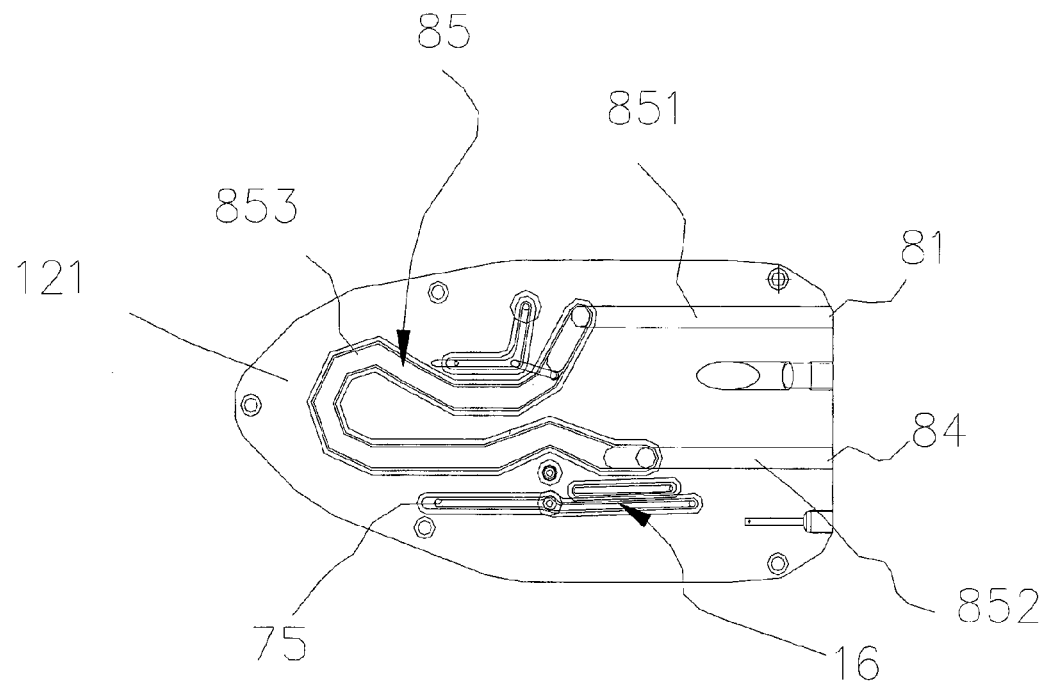
FIG. 5 is a bottom view of the pump body in the integrated SCR metering injection system of the invention.
Figure 6:
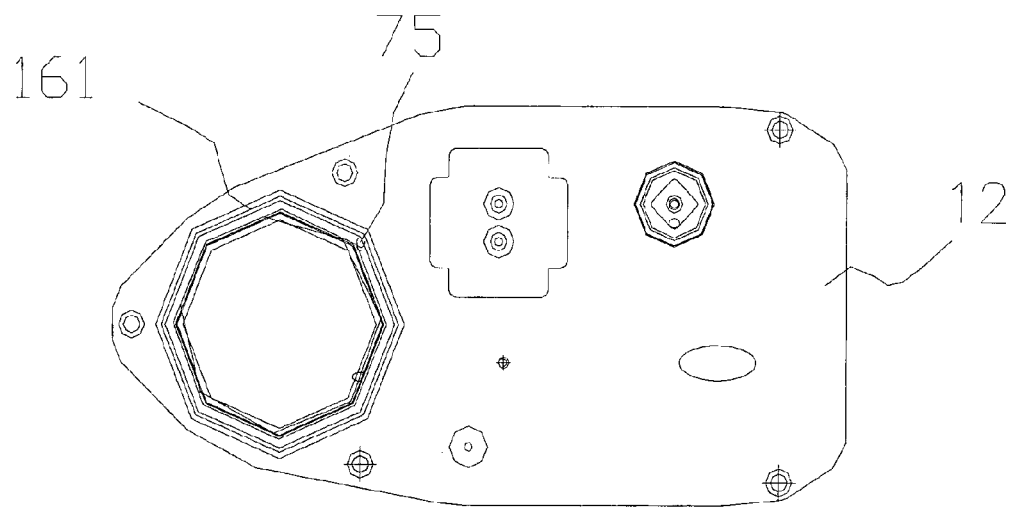
FIG. 6 is a top view of the pump body in the integrated SCR metering injection system of the invention.

As shown in FIG. 4, the cover body 11 is buckled on the pump body 12 and a closed space is formed between the cover body 11 and the pump body 12, the membrane pump 13, the metering valve 5, the mixing cavity 6, the first pressure sensor 14 and the second pressure sensor 15 are all arranged inside the closed space formed between the cover body 11 and the pump body 12, and the filter is arranged on the pump body 12 at the outer side of the cover body 11 for the purpose of facilitating cleaning and maintenance; the membrane pump 13 is used for sucking the reducing agent from the liquid storage box 2 to the liquid flow pipe 16 of the pump body, in order to offer a power source to convey the reducing agent.

As shown in FIGS. 5-8, the water heating unit 8 in the integrated SCR metering injection system of the invention uses heated engine cooling water in a recycling manner, so the reducing agent in the metering injection unit 1 and the liquid storage box 2 can be heated in cold seasons, meanwhile, the heated engine cooling water flows circularly inside the water circulation pipe to heat the pump body 12. One end of the metering valve 5 is connected with the filter 4 via a through hole 75 and the liquid flow pipe 16 in the pump body, and the other end of the metering valve 5 is connected with the mixing cavity 6, which is connected in series at the downstream of the metering valve 5. One of the flow passages is connected with the liquid inlet of the filter 4 via the through hole 75 penetrating through the pump body in the drawing and via an annular groove 161, so that the reducing agent that needs to be injected is conveyed into the filter 4 and then filtered, and finally conveyed into the metering valve 5. The other flow passage forms a liquid reflux pipe connected with a second electromagnetic valve 72 and the liquid storage box.

The water heating unit 8 includes a water inlet joint 81, a water inlet pipe 82, a water outlet pipe 83, a water outlet joint 84 and a multi-section water circulation pipe 85, the water circulation pipe 85 includes a first flow passage 851 and a second flow passage 852 both arranged inside the pump body 12, and a third flow passage 853 formed between the lower surface 121 of the pump body 12 and the transition plate 3, and the first flow passage 851 and the second flow passage 852 are respectively connected with the water inlet joint 81 and the water outlet joint 84 arranged on the sidewall of the pump body.

The water inlet pipe 82 and the water outlet pipe 83 are formed in a manner of extending downwards from the lower side of the transition plate 3, the upper ends of the both are communicated with the third flow passage 853 of the water circulation pipe 85 respectively and the bottoms of the both are communicated with each other through a heat exchanger 87, and the water inlet joint 81, the water inlet pipe 82, the water outlet pipe 83 and the water outlet joint 84 are communicated with each other in sequence through the water circulation pipe 85 in order to impart a good heating on the reducing agent in the pump body 12 and the liquid storage box 2.

Preferably, the heat exchanger 87, which is formed at the junction of the water inlet pipe 82 and the water outlet pipe 83, is a spiral structure for increasing the heating area, a heat insulating sleeve 88 is wrapped on the outer surface of the upper portion of the water inlet pipe 82, and heat insulating sleeve 88 is arranged to avoid, when the heated cooling water flows by the upper portion of the water inlet pipe, loss of excessive heat, which in turn melts the ice at the bottom of a urea box at first in order to contribute to suction.

More preferably, the metering injection device of the invention further includes a ventilation pipe 79, and the ventilation pipe 79, the suction pipe 31 and the water inlet pipe 82 are all wrapped in the heat insulating sleeve 88.

As shown in FIG. 4, a first electromagnetic valve 73 is further arranged on the pipeline of the water inlet pipe in the water heating unit 8, the first electromagnetic valve 73 is electrically connected with the control unit 17, and the control unit 17 controls the heated cooling water to perform cyclic heating and ice melting by controlling the first electromagnetic valve 73.

The control unit 17 is electrically connected with the membrane pump 13, the metering valve 5, and the first pressure sensor 14 and the second pressure sensor 15 mounted on the two ends of the metering valve 5 and the mixing cavity 6, wherein the first pressure sensor 14 is arranged at the upstream end of the metering valve 5, the second pressure sensor 15 is arranged at the downstream end of the metering valve 5, and according to a specified injection amount received by the control unit and a pressure difference between the two ends of the metering valve, the first pressure sensor 14 and the second pressure sensor 15 calculate the duty ratio of the starting pulse of the metering valve 5 to achieve the purpose of accurate metering.

The metering injection device in this embodiment further includes a compressed air unit 9, the compressed air unit 9 includes an air source 91, a second electromagnetic valve 92 and a reducing valve 93 which are serially connected in sequence, the second electromagnetic valve 92 is in circuit connection with the control unit 17, an air filter is further arranged at the downstream of the air source 91, the compressed air unit can not only provide air pressure for opening or closing of a membrane valve 71, but also provide compressed air for atomization of the reducing agent in the mixing cavity 6.

Figure 7:
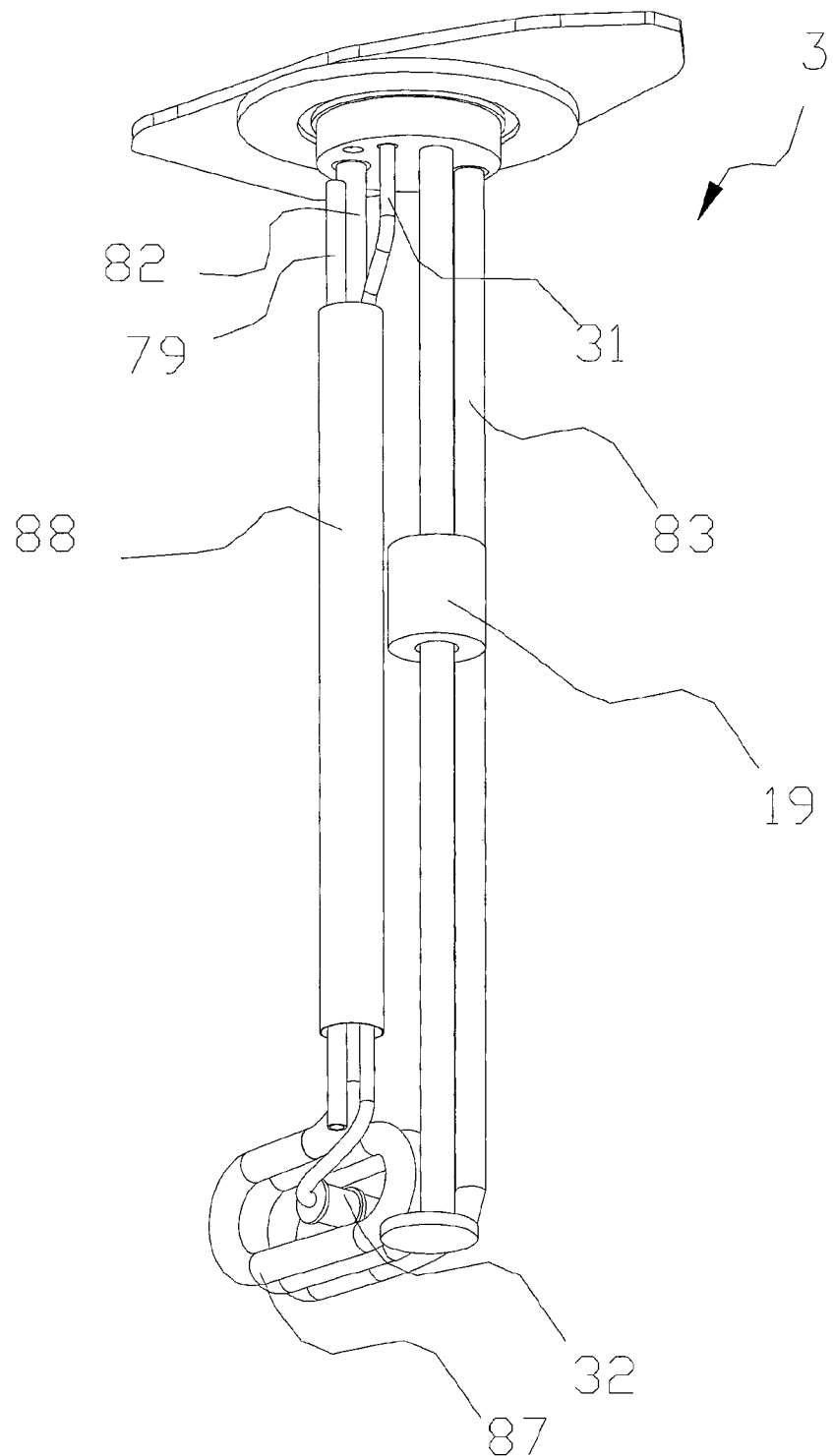
FIG. 7 is a stereogram of the transition plate of the invention.

As shown in FIGS. 4 and 7, the metering injection device of the invention further includes a sensing component 19, the sensing component 19 is composed of a displacement sensor and a first temperature sensor, the sensing component and the water heating unit are integrated below the metering injection unit, the sensing component is electrically connected with the control unit in the metering injection unit, and the sensing component provides sensed information regarding liquid level and temperature in the liquid storage box.

When the control unit receives an engine ignition signal, the control unit 17 controls a motor in the membrane pump 13 to begin an emptying action at a certain fixed rotating speed, so that the reducing agent in the liquid flow pipe 16 is returned to the liquid storage box 2 through a reflux pipe, and about 30 seconds later, the control unit 17 controls the second electromagnetic valve 72 to open the air source and close an emptying loop, the membrane pump 13 continues working at this moment, the reducing agent is conveyed to the upstream of the metering valve 5 by the pump body after passing through the liquid flow pipe 16 and the filter 4, the pressure of the reducing agent increases ceaselessly, the motor of the membrane pump stops operating when a pressure value P1 of the first pressure sensor 14 at the upstream of the metering valve 5 reaches a set value, the control unit receives an injection request and controls the metering valve 5 to begin metering injection, and the second pressure sensor 15 is used for acquiring a pressure value P2 at the downstream of the metering valve to calculate the pressure difference, and for regulating the opening pulse width of the metering valve.

The pressure value (P1) of the first pressure sensor 14 is relatively small after the control unit 17 controls the compressed air unit to close a liquid return membrane and before injection, at this moment, the control unit 17 controls the motor in the membrane pump to operate at a preset rotating speed, and about 5 seconds later, the pressure value P1 in a filtration cavity reaches an injection pressure value; P1 will decrease after injection begins, specifically depending on the injection amount, and in order to keep P1 stable, the motor begins working and the reducing agent is supplemented into the filtration cavity to keep the P1 value stable, furthermore, during this procedure, the rotating speed of the motor is subjected to closed-loop control in accordance with the injection amount and the current P1 value, so as to achieve the purpose of accurate metering.

When heating is needed at a relatively low temperature, the control unit 17 controls the second electromagnetic valve 92 to open the water heating unit after receiving a low temperature signal from the temperature sensor in inductive sensors, the heated engine cooling water flows by the water inlet joint 81, the water inlet pipe 82, the water outlet pipe 83 and the water outlet joint 84 in sequence, which realizes heating not only for the metering injection unit, but also for the reducing agent in the liquid storage box 2.

In other embodiments of the invention, other system control modes may also be employed, e.g. an airless injection system or an air injection system having the effect of secondary atomization, and a nozzle pipe at the downstream of the metering injection unit in such air injection system is communicated with the compressed air unit.

The technical contents and features of the invention have been disclosed above, however, a variety of substitutions and modifications not departing from the spirit of the invention may still be made by those skilled familiar with the art based upon the instruction and disclosure of the invention, thus, the scope of the invention shall not be limited to the contents disclosed in the embodiment, instead, shall include a variety of substitutions and modifications that do not depart from the invention and is covered by the claims of this patent application.

What is claimed is:

1. An integrated SCR metering injection system, characterized in that: the integrated SCR metering injection system includes a metering injection unit, a water heating unit for heating the metering injection unit and a transition plate arranged between the metering injection unit and the water heating unit, wherein the metering injection unit includes a pump body, a membrane pump and a metering valve, wherein the water heating unit includes a water inlet pipe and a water outlet pipe, and the water inlet pipe and the water outlet pipe communicate with each other through a heat exchanger; and wherein a water circulation pipe is provided to be connected with the water inlet pipe and the water outlet pipe, and the water circulation pipe includes a first flow passage and a second flow passage arranged inside the pump body, and a third flow passage formed between the transition plate and a lower surface of the pump body, wherein the first flow passage and the second flow passage respectively communicate with the third flow passage, and the water inlet pipe and the water outlet pipe respectively communicate with the third flow passage.

2. The integrated SCR metering injection system according to claim 1, characterized in that: the water heating unit further includes a water inlet joint and a water outlet joint, the water inlet joint and the water outlet joint are arranged on the metering injection unit, and the water inlet joint, the water inlet pipe, the water outlet pipe, the water circulation pipe and the water outlet joint are communicated with each other.

3. The integrated SCR metering injection system according to claim 2, characterized in that: the water inlet pipe and the water outlet pipe are communicated with the water circulation pipe inside the metering injection unit through the transition plate.

4. The integrated SCR metering injection system according to claim 1, characterized in that: the metering injection unit further includes a cover body buckled on the pump body, a closed space is formed between the cover body and the pump body, and the membrane pump is at least arranged inside the closed space.

5. The integrated SCR metering injection system according to claim 1, characterized in that: the third flow passage communicates with the first and second flow passages.

6. The integrated SCR metering injection system according to claim 1, characterized in that: a heat insulating sleeve is further arranged on the water inlet pipe.

7. The integrated SCR metering injection system according to claim 1, characterized in that: a heat exchanger is arranged on the junction of the water inlet pipe and the water outlet pipe.

8. The integrated SCR metering injection system according to claim 1, characterized in that: the integrated SCR metering injection system further includes a sensing component, the sensing component includes a liquid level sensor and a first temperature sensor, and the sensing component is integrated with the metering injection unit.

9. The integrated SCR metering injection system according to claim 1, characterized in that: the integrated SCR metering injection system further includes a second temperature sensor for monitoring the temperature of the metering injection unit.

* * * * *